United States Patent Office 3,544,602
Patented Dec. 1, 1970

3,544,602
PRODUCTION OF BICYCLO-[2,2,2]-OCT-7-EN-2,3,5,6-TETRACARBOXYLIC DIANHYDRIDE
Heinz Nohe, Hubert Suter, and Heinz Hannebaum, Ludwigshafen (Rhine), Germany, assignors to Badische Anilin- & Soda-Fabrik Aktiengesellschaft, Ludwigshafen (Rhine), Germany
No Drawing. Filed Aug. 26, 1968, Ser. No. 755,447
Claims priority, application Germany, Aug. 29, 1967, 1,643,654
Int. Cl. C07c 61/28
U.S. Cl. 260—346.6          6 Claims

ABSTRACT OF THE DISCLOSURE

Process for the production of bicyclo-[2,2,2]-oct-7-en-2,3,5,6-tetracarboxylic dianhydride by reaction of 3,5-cyclohexadiene-1,2-trans-dicarboxylic acid, in which the 3,5-cyclohexadiene-1,2-trans-dicarboxylic acid is first heated in the anhydride of a low molecular weight alkanecarboxylic acid in the presence of active carbon having an internal surface area of more than 500 m.$^2$/g., a bleaching earth, silica gel, an aluminum oxide or an aluminum hydroxide or a mixture of two or more of these adsorbents to the reaction temperature of from 50 to 150° C. and is then reacted with maleic anhydride.

---

This invention relates to the production of bicyclo-[2,2,2]-oct - 7-en - 2,3,5,6 - tetracarboxylic dianhydride (hereinafter referred to as "BTA").

It is known from U.S. patent application No. 389,464 now abandoned, filed Aug. 13, 1964, by Hubert Suter that 3,6-endoethyleno-1,2,4,5-cyclohexane tetracarboxylic dianhydride (=BTA) is obtained by reaction of 3,5-cyclohexadiene-1,2-transdicarboxylic acid (hereinafter referred to as CTD) with maleic anhydride in the presence of acetic anhydride at temperatures of from 50° to 150° C. This method gives good results if the CTD is extremely pure. If the CTD has been prepared for example by electrochemical reduction of o-phthalic acid, it must be subjected to careful, expensive purification, for example by recrystallization from boiling water in the presence of active carbon. The impurities cannot be detected analytically and only make their presence felt in the reaction with maleic anhydride by decreasing the yield.

It is an object of the invention to provide a process for the production of BTA from CTD in which previous expensive purification of the starting material is not required. It is another object of the invention to provide a process for the production of BTA which gives high yields, even when starting from crude CTD. These and other objects and advantages will be better understood from the following detailed description.

We have found that BTA is obtained with particular advantage by reaction of CTD with maleic anhydride in the presence of the anhydride of a low molecular weight alkanecarboxylic acid at temperatures of from 50° to 150° C. when the CTD is first heated in the anhydride of the low molecular weight alkanecarboxylic acid in the presence of active carbon having an internal surface area of more than 500 m.$^2$/g., a bleaching earth, silica gel, an aluminum oxide or an aluminum hydroxide or a mixture of two or more of these adsorbents to the reaction temperature and only then is the maleic anhydride added.

CTD may be used in pure form; it is an advantage of the process however that it may be used in the form in which it is obtained by electrochemical reduction of o-phthalic acid, for example according to U.S. patent application No. 696,136, filed Jan. 8, 1968, by Hubert Suter et al.; U.S. patent application No. 624,129 filed Mar. 20, 1967 now U.S. Pat. 3,388,035 by Hubert Suter et al.; or according to the processes of U.S. patent specifications Nos. 2,477,579 and 2,477,580. According to the said U.S. patent application No. 696,136, CTD is obtained by electrochemical hydrogenation of o-phthalic acid in dilute aqueous sulfuric acid at temperatures of up to 80° C., particularly at below 70° C., at current densities of from 1 to 40 amps/dm.$^2$ using conventional cathodes with the addition of ethers, carboxylic amides and/or nitriles which are inert under the reaction conditions, liquid at room temperature and miscible with water. Examples of suitable additives to the catholytes are dioxane, tetrahydrofuran, glycol monomethyl ether, dimethylformamide or acetonitrile. Acocrding to the said U.S. patent application No. 624,129 an analogous procedure is adopted, if desired without solvents, but lead, cadmium, tin, thallium or bismuth or an alloy of at least two of the metals lead, mercury, silver, cadmium, tin, thallium and bismuth, which may additionally be amalgamated, or pure cadmium, tin or bismuth, is used as cathode; the reaction temperature in this method is raised to 100° C. Processing of the resultant reaction mixture is carried out in the prior art methods preferably at low temperatures, particularly below 30° C., so that rearrangement of the CTD formed is avoided. It is now possible to use without any further purification the crude product obtained direct from the catholyte mixture by distilling off the ether or by diluting the catholyte containing ether, amide or nitrile with mineral acid.

Examples of suitable anhydrides of low molecular weight alkane carboxylic acids are the anhydrides of alkanecarboxylic acid having two to four carbon atoms, particularly acetic anhydride.

Among the said adsorption agents, some show a particularly favorable influence on the reaction, for example the active carbons known as R, TW, H, M or RU carbons. These carbons are characterized in the following Table 1. The active carbons are prepared as follows: R by activating lignite with steam; TW by activating peat charcoal with steam; H by activating wood charcoal with steam; RU by activating acetylene black with steam; M by activating lean coal with steam; Carboraffin by activating sawdust with zinc chloride.

TABLE 1

| Carbon | Internal surface area, m.$^2$/g. | Mean pore radius, A. | Total pore volume, cm.$^3$/g. |
|---|---|---|---|
| R | About 600 | About 46 | About 1.4. |
| TW | About 650 | About 74 | About 2.4. |
| H | About 915 | About 57 | About 2.6. |
| RU | About 900 | About 25 | About 1.0. |
| M | About 735 | About 15 | About 0.5. |
| Carboraffin | About 1,320 | About 35 | About 2.4. |

When using R, TW and H carbons, an addition of 0.1 to 1% by weight (with reference to CTD) is adequate. In the case of other active carbons and other adsorbents it is generally advantageous to use 1 to 5% by weight of adsorbent (with reference to CTD). It is remarkable that the yield of BTA is less if the adsorbent is filtered off prior to adding maleic anhydride to the solution of CDT.

The process may be carried out as a batch operation or continuously.

CTD is heated with the anhydride of the low molecular weight alkanecarboxylic acid in the presence of adsorbent to the reaction temperature, i.e. 50° to 150° C., preferably until refluxing occurs. CTD and the anhydride of the low molecular weight alkanecarboxylic acid are usually used in a molar ratio of 1:1 to 1:10, particularly 1:2 to 1:7, and the adsorbent is added in the abovementioned amount. After further heating for a short time, for example about five to ten minutes, the adsorbent may if desired be filtered off and the maleic anhydride is then added, advantageously in a molar ratio of CTD to maleic anhydride of 1:0.9 to 1:1.5, particularly 1:1.0 to 1:1.3, and the reaction mixture is kept at the reaction temperature for another ten to twenty minutes. The whole is allowed to cool, the deposited solid constituents are separated and washed with low molecular weight alcohols, such as methanol, or with acetone or water. The BTA obtained is dried. In many cases the adsorbent does not interfere with the further processing, for example in a reaction with alcohols for the production of plasticizers, so that it is not necessary to separate it previously.

In continuous operation, CTD and the corresponding amount of the anhydride of the low molecular weight alkanecarboxylic acid are heated with an addition of adsorbent and the suspension is pumped through a heating zone in a cascade of two or three stirred vessels. The heating zone is kept at the reaction temperature. When acetic anhydride is being used a residence time of from five to ten minutes is enough at temperatures of from 130° to 138° C. Other temperatures require corresponding residence times. When the adsorbent is removed prior to the addition of maleic anhydride, it is advantageous to filter it off before supplying the mixture to the cascade of stirred vessels. An amount of maleic anhydride equivalent to that of CTD is supplied in liquid form to the first stirred vessel. Depending on the size of the container, on the rate of throughput and the speed of stirring, residence times in the cascade of stirred vessels of from ten to sixty minutes have proved to be suitable. Good mixing by intense stirring, if desired by baffles in the stirred vessel, is advantageous so that the BTA which has been formed and has crystallized out may be discharged uniformly. The reaction temperature in the first stirred vessel is advantageously kept at 130° to 140° C., while in the final stirred vessel it is advantageous to have already cooled the reaction mixture to room temperature so that almost quantitative precipitation of the BTA is achieved. The BTA is processed in the same way as in the batch method of production.

The invention is illustrated by the following examples.

EXAMPLE 1

173.2 g. of crude CTD (97%=1 mole at 100%) (which has been prepared by electrochemical hydrogenation of o-phthalic acid in dilute sulfuric acid containing tetrahydrofuran), 0.85 g. of R carbon (0.5% with reference to the crude acid) and 530 g. of acetic anhydride (5 moles) are heated at 135° C. under reflux while stirring in a one-liter four-necked flask fitted with stirring means, thermometer, reflux condenser and tube for supplying solid. Heating up takes place rapidly, within about fifteen minutes. After a reaction period of ten minutes, the reaction mixture is cooled rapidly to about 100° to 120° C. and 107.5 g. (1.1 moles) of maleic anhydride is added to the reaction solution. The reaction mixture is then boiled under reflux for another fifteen minutes. BTA is precipitated. When the reaction is over, the reaction mixture is cooled to about 15° C. with ice-water and the precipitate is filtered off, washed with methanol and dried. By concentrating the filtrate to half its volume, only traces of BTA are obtained. The yield of BTA is 246 g. (99.2% of the theory). Melting point 354.5° to 355.5° C.

EXAMPLE 2

The procedure of Example 1 is followed but the reaction period prior to adding maleic anhydride is limited to one minute. The yield of BTA is 219 g. (88.3% of the theory).

EXAMPLE 3

The procedure of Example 1 is followed but the reaction period prior to adding maleic anhydride is prolonged to sixty minutes. The yield of BTA is 215 g. (86.8% of the theory).

EXAMPLE 4

The procedure of Example 1 is followed but the R carbon is filtered off by means of a suction filter prior to adding maleic anhydride. After maleic acid has been added to the filtrate, the reaction mixture is boiled under reflux for fifteen minutes. The yield of BTA is 239 g. (96.4% of the theory). Melting point 355° to 356° C.

EXAMPLE 5

The reaction according to Example 1 is carried out for comparison in the absence of active carbon. The yield of BTA is only 184.8 g. (72.5% of the theory). Melting point 354° to 355° C.

If the R carbon is not added until the maleic anhydride is added to the reaction solution, the yield of BTA is 206.5 g. (83.3% of the theory).

EXAMPLE 6

A solution of 24.6% by weight of CTD (crude product, 97%), 75.25% by weight of acetic anhydride and 0.15% by weight (0.75% by weight with reference to the dicarboxylic acid) of TW carbon in a 6-liter glass flask having a valve at the bottom, and stirred gently to stop the carbon from settling. The molecular ratio of crude dicarboxylic acid to acetic anhydride is 1:5. 0.66 liter (about 0.74 kg.) of this mixture is pumped per hour via a 1-liter dropping funnel by means of a metering pump through a heating zone into a cascade consisting of two 250 cm.³ stirred flasks provided with notches. A jacketed tube having a coiled insert and made of glass is used as the heating zone. The temperature is 130° to 135° C. Heating is effected with glycerol from a thermostat, the volume of the heating zone is 110 cm.³ and the residence time of the reaction mixture is ten minutes.

Liquid maleic anhydride is supplied at the rate of 113 g. per hour to the first stirred flask by means of a heated metering pump. The reaction temperature in the cascade is 133° to 138° C. The flasks are provided with reflux condensers. The volume of reaction mixture in each flask is kept at about 100 to 110 cm.³ so that the residence time in the cascade is about twenty minutes.

Downstream of the second flask, a cooling vessel is provided in which the reaction mixture containing BTA is cooled to 15° C. while stirring. The precipitate is collected on a suction filter and washed with methanol. The pure BTA is then dried. Its melting point is 354.5° to 356° C. At a throughput of 5.18 kg. of the mixture of dicarboxylic acid and acetic anhydride (i.e. 1.275 kg. of crude dicarboxylic acid or 1.237 kg. of 100% acid) 1.8 kg. of BTA is obtained. The yield is 98.6% of the theory.

The results of examples carried out under the experimental conditions as in Example 6 but with the TW carbon replaced by other adsorbents are shown in the following Table 2:

TABLE 2

| Example: | Adsorbent | Yield [1] |
|---|---|---|
| 7 | 0.75% of H carbon | 93.4 |
| 8 | 0.75% of Carboraffin | 80.2 |
| 9 | 0.75% of RU carbon | 81.0 |
| 10 | 0.75% of M carbon | 85.1 |
| 11 | 2% of bleaching earth | 81.3 |
| 12 | 2% of gamma-$Al_2O_3$ | 85.7 |

[1] BTA in percent of the theory.

We claim:
1. A process for the production of bicyclo-[2,2,2]-oct-7-en-2,3,5,6-tetracarboxylic dianhydride by reaction of 3,5-cyclo-hexadiene-1,2-trans-dicarboxylic acid with maleic anhydride in the presence of the anhydride of a low molecular weight alkanecarboxylic acid at a temperature of from 50° to 150° C., wherein the 3,5-cyclohexadiene-1,2-trans-dicarboxylic acid is first heated in the anhydride of the low molecular weight alkanecarboxylic acid in the presence of active carbon having an internal surface area of more than 500 m.²/g., bleaching earth, silica gel, aluminum oxide or aluminum hydroxide or a mixture of such adsorbents to the reaction temperature and only then is the maleic anhydride added.

2. A process as claimed in claim 1 wherein the molar ratio of dicarboxylic acid to maleic anhydride is from 1:0.9 to 1:1.5.

3. A process as claimed in claim 1 wherein the dicarboxylic acid is used in the form in which it has been prepared by electrochemical reduction of o-phthalic acid.

4. A process as claimed in claim 1 wherein the anhydride used is the anhydride of an alkanecarboxylic acid having two to four carbon atoms.

5. A process as claimed in claim 4 wherein the anhydride used is acetic anhydride.

6. A process as claimed in claim 1 wherein the dicarboxylic acid and the anhydride are used in a molar ratio of from 1:1 to 1:10.

References Cited

UNITED STATES PATENTS 3,125,585   3/1964   Yates _____ 260—346.6

ALEX MAZEL, Primary Examiner

B. I. DENTZ, Assistant Examiner